United States Patent Office 3,085,581
Patented Apr. 16, 1963

3,085,581
PROCESS OF TREATING TOBACCO AND THE
RESULTANT PRODUCT
Sheldon Rosenberg, Westport, Conn., assignor to Alles &
Fisher, Inc., Boston, Mass., a corporation of Massachusetts
No Drawing. Filed July 20, 1960, Ser. No. 44,031
4 Claims. (Cl. 131—144)

The invention disclosed herein relates to a process for treating tobacco with an aromatic substance such as menthol and to the product made from the treated tobacco.

It is known that mentholated tobacco is not new and that it has been extensively used in the manufacture of cigarettes. However, so far as applicant is aware, it has not been successfully used in the treatment of tobacco which is subsequently made into cigars. The reason for this appears to be that the tobacco used in cigarettes is extremely fine and offers a large surface area and after treatment the relatively large bulk incorporated in each cigarette substantially assists in maintaining the mentholated flavor for a long period of time. On the other hand, cigars are not made from relatively fine tobacco and there is relatively less bulk when the tobacco is incorporated into a cigar. It has been found that by utilizing particular ingredients and treating the cigar tobacco therewith a most acceptable product is obtained.

From the foregoing it becomes obvious that the object of this invention is the treating of cigar tobacco to give it a mentholated flavor, wherein specific ingredients are combined in a specific manner. The ingredients utilized for the treatment are menthol crystals and butylene glycol, and these are initially mixed and then diluted in water for treating purposes.

The process herein will be described with relation to a 10 pound cigar filler mixture which may be of any suitable type, which in the preferred embodiment is one-half Cuban-grown tobacco and one-half domestic-grown tobacco, although the proportions of filler are not essential to the invention herein. Although the process is described with respect to a 10 pound filler mixture, any desired weight of tobacco may be treated by adjusting the proportions of the treating ingredients in direct proportion to the weight of the tobacco.

In treating a 10 pound filler mixture it is preferable to use approximately 1 ounce of menthol crystals USP, although this amount may be increased or decreased depending upon the resultant desired taste, approximately 0.8 of one ounce having been found to give a taste which is acceptable to most smokers.

The menthol crystals are combined with approximately 4 ounces of 1.3 butylene glycol and then diluted in 12 ounces of water. This is accomplished by heating the menthol crystals to approximately 120° F. to cause them to melt. Simultaneously the butylene glycol is heated to 120° F., whereupon the melted crystals are added to the glycol and the two are stirred until a homogeneous composition results. This composition is then diluted in 12 ounces of water which also has a temperature of 120° F.

With the ingredients so prepared the mixture is sprayed onto 10 pounds of tobacco which has been dispersed over an area of approximately 10 square feet on a surface of a non-absorbent character. The composition may be sprayed from any suitable spray vessel and nozzle taking care to distribute it as evenly as possible over the tobacco. When all the composition has been sprayed the filler and mix are blended to a conclusion and then placed into a suitable container for mulling and seasoning for a period of from 24 to 48 hours prior to use.

The treated tobacco may then be made into cigars in the usual manner. The incorporated butylene glycol not only acts as a fixer or inhibitor preventing evaporation of the essence of menthol, but also acts as a humectant. The resultant cigar is non-toxic and has a favorable menthol taste although it retains the aroma to which cigar smokers are accustomed.

What I claim is:

1. The process of treating cigar tobacco which comprises forming a composition including menthol crystals, butylene glycol and water and spraying said composition over the tobacco.

2. The process of treating cigar tobacco which comprises dispersing 10 pounds of the tobacco over a 10 foot square area and thereafter spraying the tobacco with a composition consisting of approximately one ounce of menthol crystals, 4 ounces of butylene glycol and 12 ounces of water.

3. The process according to claim 2 wherein, the composition is formed and sprayed at a temperature of approximately 120° F.

4. The process of preparing a composition for treating cigar tobaccos which comprises melting menthol crystals, stirring said melted menthol into butylene glycol at the melting temperature of the crystals, then diluting in water at the same temperature.

References Cited in the file of this patent

UNITED STATES PATENTS

| | | |
|---|---|---|
| 258,781 | Luby | May 30, 1882 |
| 843,538 | Knox | Feb. 5, 1907 |
| 1,407,274 | Hibbert | Feb. 21, 1922 |
| 2,369,847 | Olsen et al. | Feb. 20, 1945 |
| 2,449,411 | Rapaport | Sept. 14, 1948 |
| 2,565,052 | Sowa | Aug. 21, 1951 |
| 2,799,278 | Bogaty | July 16, 1957 |

FOREIGN PATENTS

| | | |
|---|---|---|
| 357,517 | Great Britain | Sept. 21, 1931 |